Aug. 9, 1966 M. H. RAHM ETAL 3,265,821
METER PROTECTOR DEVICE FOR ELECTRIC MOTORS INCLUDING A
DRIVEN INDICATOR ARM AND A SLAVE ARM AND A STOP MEANS
FOR SEPARATING THEM UNDER OVERLOAD CONDITIONS
Filed Oct. 24, 1963

INVENTORS.
Melvin H. Rahm
Dean H. Schmoker
BY
*Edwards*
ATTORNEYS 3,265,821
METER PROTECTOR DEVICE FOR ELECTRIC MOTORS INCLUDING A DRIVEN INDICATOR ARM AND A SLAVE ARM AND A STOP MEANS FOR SEPARATING THEM UNDER OVERLOAD CONDITIONS
Melvin H. Rahm, 324 Judson St., and Dean H. Schmoker, Route 2, Longmont, Colo.
Filed Oct. 24, 1963, Ser. No. 318,702
10 Claims. (Cl. 200—56)

This invention relates to protectors for electric circuits, and more particularly to overload protectors for electric circuits which have a wide range of power consumption as, for example, electric circuits containing electric motors.

In providing a protector for an electric circuit it is desirable to have a device which is responsive to small changes in the circuit and operates quickly to remove the power source. Further, it is desirable to have a protector which can be adjusted for different circuit power requirements such as those containing electric motors which range from fractional to over several hundred horsepower.

The object of this invention is, therefore, to provide a protector for electric circuits which has a predetermined setting for a particular overload and is adjustable for a wide range of power requirements. Another object of this invention is to provide a protector for electric circuits which is sensitive to small changes in the circuit and is also fast acting.

A further object of this invention is to provide a device which performs the dual function of protecting the electric circuit and also gives a visual indication of the present condition of the circuit.

Another object of this invention is to provide a protector for an electric circuit which resets automatically for subsequent operation after actuation.

Other objects, advantages and capabilities of the invention will become apparent from the following description and claims taken in conjunction with the accompanying drawings, showing only a preferred embodiment of the invention.

Figure 1:
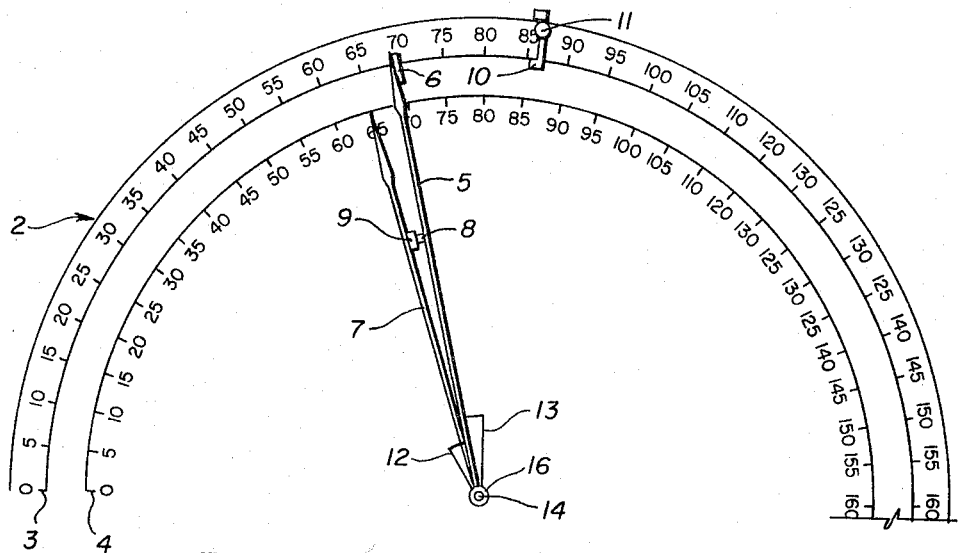
Figure 3:
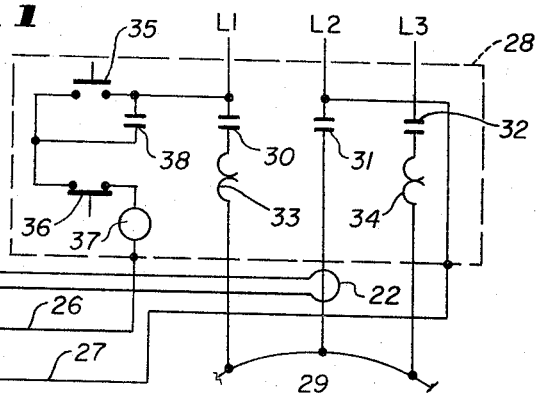
Figure 2:
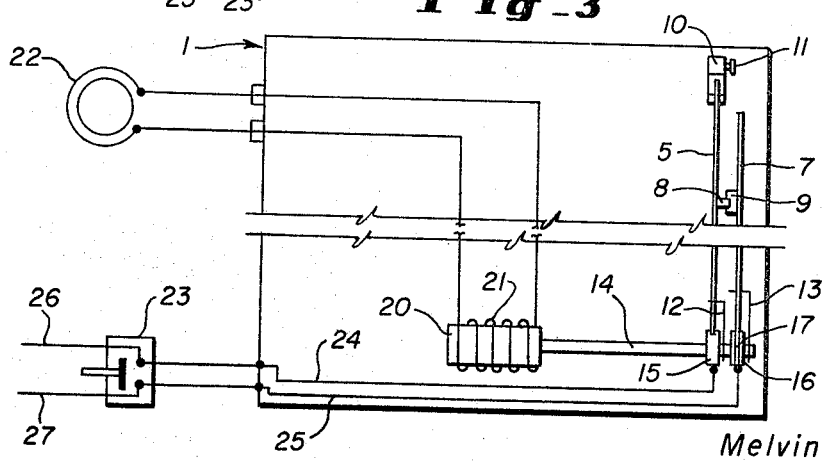

In the drawings:
FIG. 1 is a fragmentary elevational view showing the meter face according to this invention.
FIG. 2 is a schematic view showing a complete arrangement of the meter, together with the electrical connections for the current transformer and the bypass switch.
FIG. 3 is a circuit diagram showing one arrangement of power source and load to be protected.

In FIG. 1 there is shown a meter face indicated generally by numeral 2. Meter face 2 is illustrated as having an outer scale 3 calibrated from 0 to 160 in electrical units, preferably amps, proceeding from left to right which indicate load conditions, and an inner scale 4 similarly calibrated. For convenience of illustration two scales are shown but one scale would be satisfactory. A longer slave arm 5 is rotatably mounted on shaft 14 and rotates about a central axis passing over the outer scale 3 to indicate electrical units. An inner driving arm 7 similarly is mounted on shaft 14 and rotates about a central axis passing over the inner scale 4 to indicate electrical units. Attached to slave arm 5 is an electrical contact 8, and to arm 7 an electrical contact 9.

In the embodiment shown in FIG. 1, arms 5 and 7 are of electrical conductive material and when contacts 8 and 9 are together, as shown, an electrical circuit connection exists between their respective arms. An insulator 6 is attached to arm 5. Contacts 8 and 9 are made of a good electrical conductive material such as silver to assure a good electrical connection therebetween. Contact 9 is constructed to prevent contact 8 from moving past contact 9 when arm 7 moves in a counterclockwise direction. This is accomplished, for example, by having contact 9 overlap contact 8—as illustrated in FIG. 2. The angular displacement between arms 5 and 7 shown in FIG. 1 is shown merely to illustrate the relationship of the contacts and in actual practice arm 7 would preferably be in line with arm 5 and each arm would thereby indicate the same electrical unit.

A stop 10 is movably arranged on outer scale 3 and has mounted thereon an adjusting screw 11 which secures stop 10 at a preselected meter reading.

Attached to shaft 14 or any other convenient anchor is spring 13 which biases arm 7 toward zero deflection, and spring 12 which biases arm 5 toward maximum deflection. Spring 13 is of greater strength than spring 12 and will overcome spring 12 forcing both arms to zero when no current is flowing through the field winding of the meter. Springs 12 and 13 are preferably of the simple hair spring type.

Referring to FIG. 2, the meter is generally indicated by numeral 1. Arm 5 is shown mounted on a collar portion 15 with a hole therein (not shown) to allow passage over shaft 14. Arm 7 similarly has a collar portion 16 with a hole therein to allow passage over shaft 14. Arm 7 is rigidly attached to shaft 14 by a pin 17, while arm 5 rotates freely thereon. Collar portions 15 and 16 are suitably electrically insulated from shaft 14. An electrical lead 24 is connected to collar portion 15, and electrical lead 25 is connected to collar portion 16, thus making a complete electric circuit between leads 24 and 25 when contact 8 touches contact 9. With contacts 8 and 9 arranged as shown in FIG. 2, there is an overlap between contacts 8 and 9 and contact 8 is pressed against contact 9 by biasing springs 12 and 13.

Armature 20 has shaft 14 rigidly attached thereto, with a field winding 21 surrounding the armature 20. This armature and field are similar to that found in a conventional ammeter. A current transformer 22 is connected across field winding 21. An on-off normally-open push button switch 23 is connected to collar portions 15 and 16 through leads 24 and 25, respectively. Lead 26 is connected to lead 24 and lead 27 to lead 25 to provide input connections to spring biased normally open switch 23.

FIG. 3 shows a system in which the overload protector, according to this invention, can be utilized to protect an electrical component in an electric circuit. Power lines L1, L2, L3, supplying three-phase power are connected through a switching mechanism, generally indicated by the numeral 28, to motor 29. For the purpose of illustration, a conventional across the line magnetic starter is shown for switching mechanism 28 which includes the following: line contactors 30, 31, and 32 serially connected to power lines L1, L2, and L3, respectively; conventional overload protectors 33 and 34 are serially connected in lines L1 and L3, respectively; normally-open start-button 35 serially connected to normally-closed stop-button 36 and contactor coil 37; and a maintaining contactor 38 is connected across starter button 35.

Lead 26 is connected through coil 37, stop button 36 and parallel arrangement of start button 35 and contactor 38 to power line L1. Lead 27 is connected directly to power line L2. Current transformer 22 is inductively connected in power line L2 to indicate current drawn by motor 29.

The operation of the invention is as follows: assuming that motor 29 draws approximately 80 amps at full load current and approximately 155 amps on starting. Adjusting screw 11 is loosened and stop 10 is set at 85 amps (as shown in FIG. 1) and then screw 11 is tightened. Switch 23 is manually held closed to bypass arms 5 and 7 and provide a complete circuit through coil 37 when start button 35 is closed. Start button 35 is depressed, closing contactors 30, 31, 32, 38 which connect power lines L1, L2, L3 to the motor 29 and bypass starter button 35. As is well known the starting current of most electric motors under load exceeds, for short intervals, to a substantial degree the full load current. Therefore, with the starting current of motor 29 at 155 amps, arm 7 will proceed to indicate 155 amps and arm 5 will be stopped by stop 10 at 85 amps. When the motor 26 falls back from the starting condition to draw its normal full load current, electrical contact will be made between contacts 8 and 9 because of biasing springs 12 and 13 and switch 23 can be released to open.

In the event that motor 29 begins to draw more than normal full load current, current transformer 22 applies an increased current to field winding 21 to rotate armature 20 and ultimately arm 7 in a clockwise direction. When, for example, current reaches 86 amps, slave arm 5 will be halted by a stop 10 at 85 amps but driving arm 7 will advance to 86 amps, thus opening contacts 8 and 9. This cuts the electric power to coil 37 which when deenergized opens contactors 30, 31, and 32, breaking the circuit between power lines L1, L2, and L3 to motor 29. The connection of the protector according to this invention in the holding circuit of a conventional starter is merely illustrative of one typical type of switching mechanism 28 which could be used. Other relay systems well known in the electric motor art which, when deenergized, will open the circuit to motor 29 could be used.

Furthermore, a tachometer which would indicate motor speed rather than line current could be used in place of current transformer 22. Additionally, it is obvious that only a portion of arms 5 and 7 which extends from shaft 14 to contacts 8 and 9, respectively, need be of electrical conductive material.

Although the invention has been described with a certain degree of particularity, it is understood that the present disclosure has been made only by way of example and that numerous changes in details of construction and the combination and arrangement of parts may be resorted to without departing from the spirit and the scope of the invention as hereinafter claimed.

We claim:

1. A protector for an electric circuit including a power source and a load comprising an electrical indicating meter including actuating means responsive to said load, a calibrated scale mounted on said meter, a driving arm mounted on said meter and connected to said actuating means for movement across said scale to indicate the load in said circuit, first contact means attached to said driving arm, a slave arm mounted on said meter for conjoint movement with said driving arm, second contact means attached to said slave arm, electrical means coupled to said first and second contact means for connecting and disconnecting said power source from said load, biasing means holding said drive arm adjacent said slave arm and thereby holding said second contact means against said first contact means to provide a closed circuit through said contact means, and stop means attached to said scale in position to contact and to stop said slave arm at a predetermined point and thereby separate said contact means when the current indicated by said drive arm exceeds said predetermined point.

2. A protector according to claim 1 wherein said stop means is adjustable for different loads.

3. A protector according to claim 1 wherein said biasing means includes spring means pressing said driving arm toward minimum deflection and said slave arm toward maximum deflection.

4. An overload protector for opening the electric power line to an electric motor comprising an electrical indicating meter including actuating means responsive to the load on said motor, a scale calibrated in electrical units mounted on said meter, a first arm mounted on said meter and having at least a conductive portion, said first arm being connected to said actuating means and movable across said scale, said first arm having a first electrical lead attached to said conductive portion, a slave arm having at least a conductive portion mounted on said meter for conjoint movement with said first arm across said scale and under the influence of said first arm, said slave arm having a second electrical lead attached to its said conductive portion, biasing means holding said slave arm biased against said first arm with said second contact against said first contact so that said slave arm will follow said first arm and provide a closed circuit through said arms, releasable stop means mounted on said scale to contact and stop said slave arm at a predetermined point and thereby opening the electric circuit through said conductive portions on arms as said first arm passes said predetermined point registering a current greater than said predetermined point.

5. An overload protector according to claim 4 wherein a switch means is connected across said first and said slave arms to bypass the electric power from said arms during the starting of said motor.

6. An overload protector according to claim 4 wherein said biasing means includes a spring pressing said first arm to minimum deflection and said slave arm to maximum deflection.

7. An overload protector according to claim 4 wherein said stop means is adjustably mounted along said scale for variable predetermined overloads.

8. In electric apparatus including a power line connected to an electric motor, starter means connected between said line and said motor to connect and disconnect said line from said motor, a holding circuit in the starter means to maintain the connection of said line with said motor, a meter having a scale and sensing means inclusive of driven indicator means responsive to the current drawn by said motor and to indicate current drawn by said motor on said scale, the improvement which comprises an overload protector inclusive of slave arm means mounted on said meter and arranged for conjoint movement with said driven indicator means, first contact means attached to said driven indicator means, second contact means attached to said slave arm means, electrical means coupled to said first and second contact means for connecting and disconnecting said power line from said motor, biasing means holding said slave arm means adjacent said driven indicator means and thereby holding said contacts together providing a closed circuit through said contact means, and stop means adjustably mounted on said scale in position to contact and stop said slave arm means at a predetermined point and thereby separate said contacts when said driven indicator passes said predetermined point indicating a current greater than said predetermined point and opening the circuit to said motor.

9. The improvement of claim 8 wherein said driven indicator means includes pivoted driving arm means biased toward minimum deflection and said slave arm means is a pivoted arm and biased toward maximum deflection.

10. The improvement of claim 9 wherein said meter is an ammeter having rotatable armature means responsive to current drawn by said motor and said scale is calibrated in amps, and said driven indicator means is rigidly mounted on and driven by said rotatable armature.

References Cited by the Examiner

UNITED STATES PATENTS 2,543,680   2/1951   Veevers et al. _____ 200—56 X

BERNARD A. GILHEANY, *Primary Examiner.*

H. A. LEWITTER, *Assistant Examiner.*